United States Patent
Ng et al.

(10) Patent No.: US 10,951,937 B2
(45) Date of Patent: Mar. 16, 2021

(54) SYSTEMS AND METHODS FOR EFFICIENTLY PROVIDING MULTIPLE COMMENTARY STREAMS FOR THE SAME BROADCAST CONTENT

(71) Applicant: Peerless Media Ltd., Gibraltar (GI)

(72) Inventors: Frank Ng, Irvine, CA (US); Adam Pliska, Newport Beach, CA (US); David Moon, Los Angeles, CA (US)

(73) Assignee: Peerless Media Ltd., Gibraltar (GI)

(*) Notice: Subject to any disclaimer, the term of this patent is extended or adjusted under 35 U.S.C. 154(b) by 16 days.

(21) Appl. No.: 16/168,222

(22) Filed: Oct. 23, 2018

(65) Prior Publication Data

US 2019/0124383 A1 Apr. 25, 2019

Related U.S. Application Data

(60) Provisional application No. 62/577,031, filed on Oct. 25, 2017.

(51) Int. Cl.
*H04N 21/2668* (2011.01)
*H04N 21/81* (2011.01)
(Continued)

(52) U.S. Cl.
CPC ..... *H04N 21/2668* (2013.01); *H04N 21/2393* (2013.01); *H04N 21/23424* (2013.01);
(Continued)

(58) Field of Classification Search
CPC ......... H04N 21/2668; H04N 21/23424; H04N 21/2393; H04N 21/4622; H04N 21/4667;
(Continued)

(56) References Cited

U.S. PATENT DOCUMENTS

2009/0055538 A1 2/2009 Conradt et al.
2011/0202967 A1* 8/2011 Hecht ............ H04N 21/234309
725/114
(Continued)

OTHER PUBLICATIONS

Spangler, Todd. 10 Takeaways From Variety's Entertainment and Tech Summit. Posted and first accessed Sep. 6, 2018. (https://variety.com/2018/digital/news/takeaways-variety-entertainment-tech-summit-1202931545/maz/).
(Continued)

*Primary Examiner* — Randy A Flynn
(74) *Attorney, Agent, or Firm* — Beem Patent Law Firm

(57) ABSTRACT

Systems for efficiently providing multiple commentary streams for the same underlying broadcast content may include client applications that enable a user/viewer to select multiple commentary streams for a variety of events from one or more content sources. Exemplary broadcast content may include television shows, movies, and events that may include, for example, a plurality of live and/or recorded poker tournaments, eSports events, and the like. For each event, the systems also may enable a user/viewer to select from one or more live and/or recorded commentaries associated with the event. The event content and the commentary stream may be displayed in different display regions on a single device (such as a computer) or may be displayed simultaneously on different devices. Various technical advantages may be achieved by separating the event content from the commentary content. Revenue for the broadcast may be shared between the event content provider and the commentary content providers. Other implementations also are described.

22 Claims, 5 Drawing Sheets

(51) Int. Cl.
  *H04N 21/234* (2011.01)
  *H04N 21/4722* (2011.01)
  *H04N 21/466* (2011.01)
  *H04N 21/472* (2011.01)
  *H04N 21/239* (2011.01)
  *H04N 21/84* (2011.01)
  *H04N 21/462* (2011.01)
  *H04N 21/4788* (2011.01)

(52) U.S. Cl.
  CPC ..... *H04N 21/4622* (2013.01); *H04N 21/4667* (2013.01); *H04N 21/4722* (2013.01); *H04N 21/4788* (2013.01); *H04N 21/47217* (2013.01); *H04N 21/812* (2013.01); *H04N 21/8133* (2013.01); *H04N 21/84* (2013.01)

(58) Field of Classification Search
  CPC ......... H04N 21/47217; H04N 21/4722; H04N 21/4788; H04N 21/812; H04N 21/8133; H04N 21/84
  See application file for complete search history.

(56) References Cited

U.S. PATENT DOCUMENTS

| | | | | |
|---|---|---|---|---|
| 2012/0066594 A1* | 3/2012 | Gavade | .............. | H04N 21/2743 715/716 |
| 2012/0236201 A1* | 9/2012 | Larsen | ............... | H04N 21/8106 348/468 |
| 2012/0321271 A1* | 12/2012 | Baldwin | ............ | H04N 21/4126 386/201 |
| 2013/0318193 A1* | 11/2013 | Koli | ................... | G06Q 30/0233 709/213 |
| 2013/0318574 A1* | 11/2013 | Brink | ....................... | H04N 7/15 726/4 |
| 2014/0089801 A1* | 3/2014 | Agrawal | ............ | H04N 21/8547 715/719 |
| 2014/0325540 A1* | 10/2014 | Garza | .............. | H04N 21/44218 725/12 |
| 2015/0095433 A1* | 4/2015 | Grossman | .......... | H04N 21/4756 709/206 |
| 2017/0289619 A1 | 10/2017 | Xu et al. | | |
| 2018/0192089 A1* | 7/2018 | Liston | ................ | H04N 21/4667 |

OTHER PUBLICATIONS

Spangler, Todd. Meet Scener: Social-Video Commentary Startup Rides on Top of Netflix, Hulu Content. Posted and first accessed Sep. 5, 2018. (https://variety.com/2018/digital/news/scener-social-video-commentary-netflix-hulu-1202915429/).

YouTube Video. How to: Subtitles & Audio: Netflix. Published on YouTube on Oct. 23, 2017. 1 minute, 56 seconds long.

Notification of Transmittal of the International Search Report and Written Opinion dated Jan. 7, 2019, issued in International Application No. PCT/US2018/057525 (19 pages).

* cited by examiner

SYSTEMS AND METHODS FOR EFFICIENTLY PROVIDING MULTIPLE COMMENTARY STREAMS FOR THE SAME BROADCAST CONTENT

CROSS-REFERENCE TO RELATED APPLICATIONS

This application also claims priority to U.S. Provisional Patent Application No. 62/577,031 filed Oct. 25, 2017, which is incorporated by reference in its entirety.

BACKGROUND

1. Technical Field

This application is directed to the field of streaming of a broadcast event, and more particularly to providing a user access to multiple commentators on the same underlying broadcast content.

2. Related Art

Broadcasting of events such as sporting competitions can draw tens or hundreds of millions of viewers, making them attractive for advertisers. These types of events typically are broadcast along with commentary which explains the action unfolding on the screen and provides other entertainment or value to the viewer. In many cases, the quality of the commentary increases the viewership of the event.

Under current broadcasting systems, content in which commentators provide analysis (e.g., sporting events, political debates, etc.) can only be provided with one set of commentators, and therefore only a limited point of view. In order to provide multiple points of view, such as commentary specific for a "home team" and an "away team," each commentary content creator often needs to obtain their own event content, requiring cameras, cameramen, microphones, video and audio mixers and the like. Even where event coverage is shared among multiple commentators, the commentary and event content still need to be combined and broadcast to the user separately from any other broadcast. This creates technical problems and barriers to entry for commentary content creators.

Accordingly, a need has long existed for improved broadcasting systems, including systems for broadcasting events with multiple commentary streams.

SUMMARY

Disclosed herein are systems for efficiently providing multiple commentary streams for the same broadcast content that may include client applications that enable a user/viewer to select commentary for a variety of events from one or more content sources. Exemplary broadcast content may include television shows, movies, or events that may include, for example, a plurality of live and/or recorded poker tournaments, electronic sporting ("eSports") events, traditional sporting events, and the like. For each event, the systems also may enable a user/viewer to select from one or more live and/or recorded commentaries associated with the event. The event content and the commentary stream may be displayed in different display regions on a single device (such as a computer) or may be displayed simultaneously on different devices. Various technical advantages may be achieved by separating the event content from the commentary content. Revenue for the broadcast may be shared between the event content provider and the commentary content providers. Other implementations also are described.

Other systems, methods, features, and technical advantages of the invention will be, or will become apparent to one with skill in the art upon examination of the following figures and detailed description. It is intended that all such additional systems, methods, features, and technical advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION OF THE PREFERRED EMBODIMENTS

The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of systems and methods consistent with the content streaming system architecture may be stored on, distributed across, or read from other machine-readable media, for example, secondary storage devices such as hard disks, floppy disks, and CD-ROMs; a signal received from a network; other forms of ROM or RAM either currently known or later developed; and the like.

Furthermore, although specific components of the communications architecture will be described, methods, systems, and articles of manufacture consistent with the content management system architecture may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, and other data structures may be separately stored and managed, may be incorporated into a single memory or database, may be distributed, or may be logically and physically organized in many different ways, such as using structured and/or unstructured data. Programs may be parts of a single program, separate programs, or distributed across several memories and processors. Systems may be implemented in hardware, software, or a combination of hardware and software in one processing system or distributed across multiple processing systems.

1.0 Multiple Commentary Broadcasting System Overview

Figure 1A:
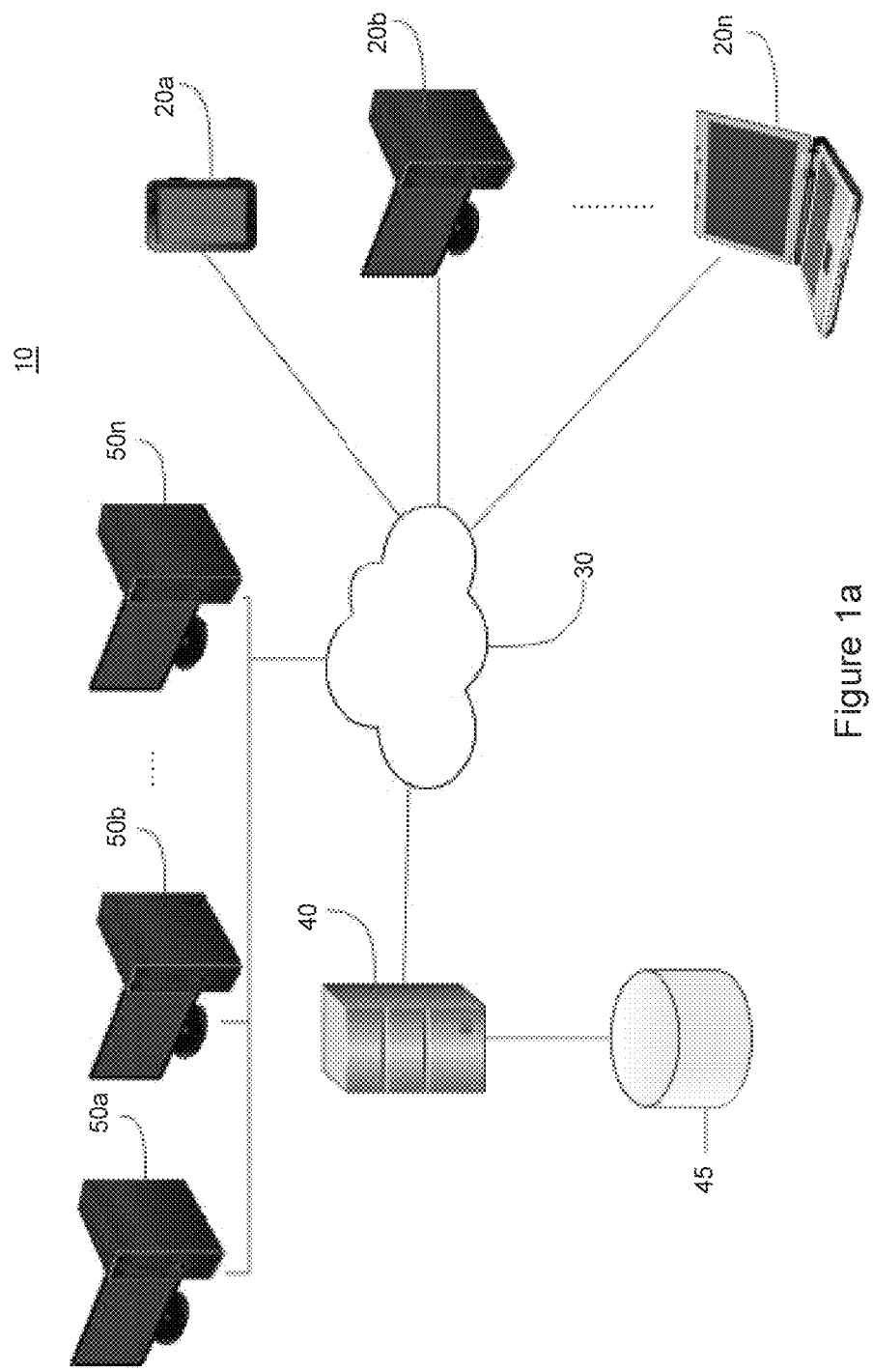
FIG. 1a shows an exemplary physical architecture for an exemplary system for providing multiple commentary streams for an underlying broadcast content.

As shown in FIG. 1a, an exemplary architecture 10 for a system for providing multiple commentary streams for an underlying event content is shown. One or more client devices may run client applications 20a-n which may communicate with a content broadcasting server 40 via a communications network 30. The client applications 20a-n may provide an interface to the user to view the event content and the commentary content, interact with the server 40, and provide selection and/or other data to the server 40. In response, the server 40 may provide the selected event content data and commentary content data to the client applications 20a-n. The server 40 may store information in one or more data storage devices 45. The server 40 also may communicate with one or more content sources 50a-n to receive broadcast content data and/or commentary content data that are in turn provided to the client applications 20a-n.

By providing multiple commentary content streams for each broadcast data such as event content data, the viewer may receive commentary from various points of view for the same underlying content. The commentary content may be accessible along with the actual underlying content, and allows viewers to choose the prism through which content is analyzed and presented to them. For example, "home team" and "away team" commentary may be provided similar to that of a traditional sports broadcast. Unlike traditional broadcasts, however, the broadcast systems 10 described herein eliminate the need for each commentary to be combined with event content and broadcast to the user. The systems 10 also enables the same event content to be used and/or licensed by multiple commentary content creators so that each commentary content creator does not need to obtain their own event content as in traditional event broadcasts.

Additionally, or alternatively, a variety of other types of commentary content also may be provided efficiently. For example, comedic commentary, political commentary, financial commentary and the like all may be provided simultaneously to the viewer/user. The viewer/user also may switch between the commentary streams as they desire.

The broadcast content may be live or recorded, and the commentary content also may be live or recorded. For example, a viewer may watch live event content and live commentary content. Alternatively, or additionally, a viewer may watch recorded content with live or recorded commentary content. The event content and the commentary may be synchronized so that the commentary is accurately describing the event. Synchronization may be implemented using time codes, frame counts, or the like. In some embodiments, commentary content may relate only to a portion of the event data, such as a final table of a poker tournament or final match of an eSports competition. In such embodiments, the viewer may be able to view the entire event content (including the event data without associated commentary) and/or may be automatically directed to the beginning of the event data for which commentary content is present. Other implementations also may be used.

System 10 also may provide for revenue sharing between the event content creators and the commentary content creators in a variety of ways. For example, the event and/or commentary may be distributed on a pay-per-view basis, whereby the viewer picks the commentator and directly pays either the commentator, the event content provider, or both. Prices may be standard across all commentary and/or event content, or prices may vary depending on the event and commentator. Alternatively, or additionally, event content creators and commentary content creators may have revenue sharing arrangements between each other so the viewer is only required to pay one entity. As another example, an affiliate model may be used in which commentators may be free to pick for viewers, but the underlying event content provider may share ad or production/distribution revenue with commentators based on the number of times viewers chose a particular commentator, the time each viewer spent watching a commentary, and the like. The affiliate model may provide a way to monetize commentary for any person that wanted to provide commentary on content. Other revenue sharing models also may be used.

Figure 1B:
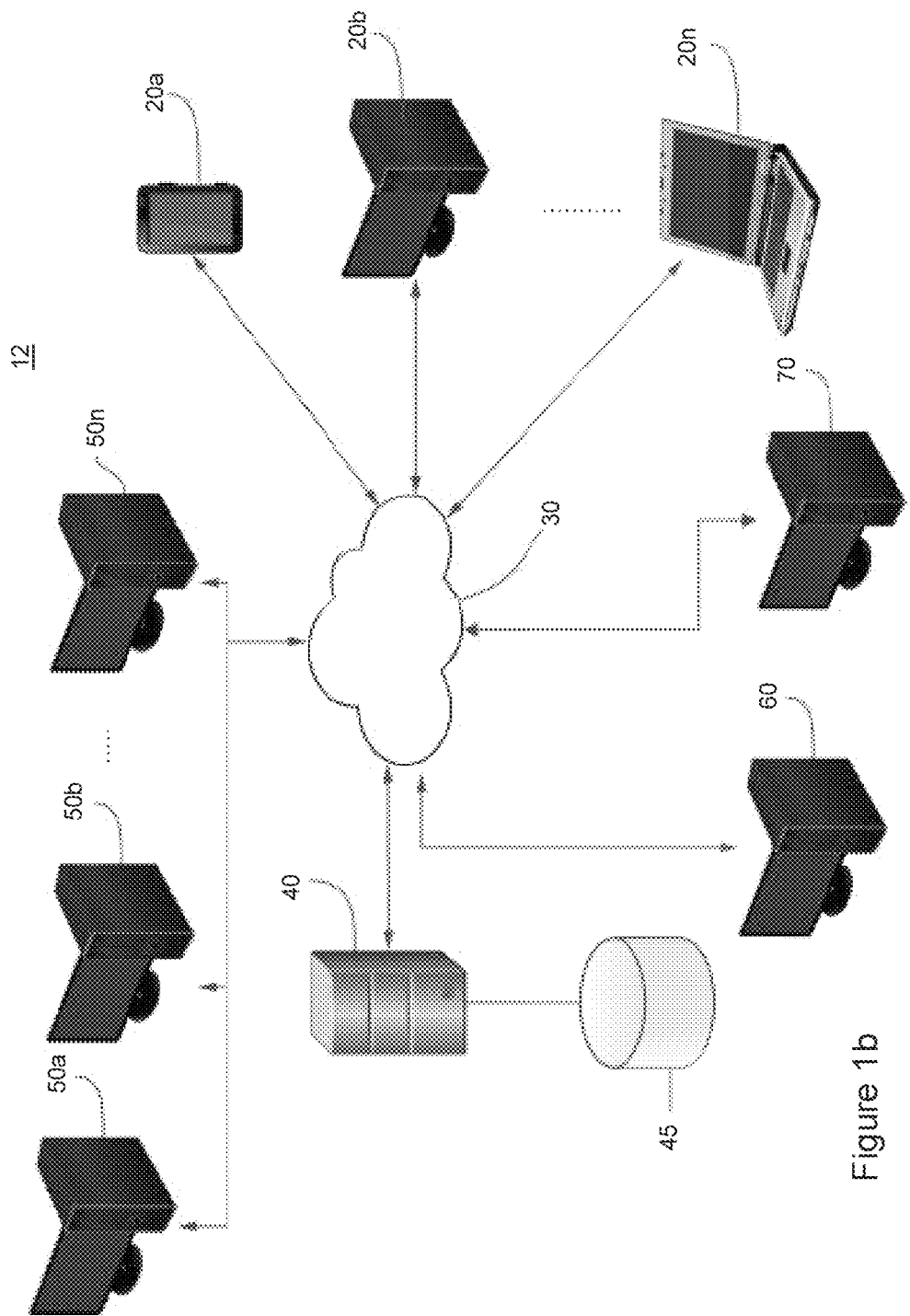
FIG. 1b shows another exemplary physical architecture for an exemplary system for providing multiple commentary streams for an underlying broadcast content.

Another exemplary system for an exemplary architecture 12 for a system for providing multiple commentary streams for an underlying event content is shown in FIG. 1b. Similar to the system shown in FIG. 1a, one or more client devices may run client applications 20a-n which may communicate with a content broadcasting server 40 via a communications network 30. The client applications 20a-n may provide an interface to the user to view the event content and the commentary content, interact with the server 40, and provide selection and/or other data to the server 40. In response, the server 40 may provide the selected event content data and commentary content data to the client applications 20a-n. The server 40 may store information in one or more data storage devices 45. The server 40 also may communicate with one or more content sources 50a-n to receive broadcast content data and/or commentary content data that are in turn provided to the client applications 20a-n. Each of these components may operate as described above.

In addition, the architecture 12 may include one or more brand investment systems 60 and one or more third-party broadcast systems 70. The brand investment system 60 may enable advertisers to define campaigns, submit collateral, view scheduled feeds, select particular feeds and/or commentators, and the like. The third-party broadcast systems 70 may allow commentators to distribute commentary data and/or combined broadcast and commentary data to one or more distribution platforms. In some embodiments, the third-party broadcast systems 60 may communicate directly with one or more content sources 50a-50n via communications network 30. Alternatively, or additionally, broadcast server 40 may act as an intermediary between the third-party broadcast systems 60 and one or more content sources 50a-n for some or all of a broadcast.

Although references will now be made to specific components of the system performing specific features, it should be apparent to one of ordinary skill in the art that such references are exemplary and are not intended to limit the scope of the claims in any way; furthermore, the functionalities described herein may be implemented in a virtually unlimited number of configurations. For example, the server 40 may be implemented as a single server configured to provide all of the systems functionalities, or the functionalities may be implemented across multiple servers. In addition, this disclosure refers to system 10 and system 12 interchangeably and any discussion of the one applies to the other even if it is not specifically referenced.

1.1 Exemplary Client Applications

Client applications 20a-n may provide a user interface for the system and may communicate content selection information, user profile information, game data and other information with broadcast server 40 via communications network 30. The client applications 20*a-n* also may communicate with one another. In one embodiment, client applications 20*a-n* may comprise stand-alone applications which may be either platform dependent or platform independent. For example, client applications 20*a-n* may be stand-alone applications for a mobile phone configured to run on a mobile operating system such as the iOS™ operating system from Apple Inc. located in Cupertino, Calif., the Android™ operating system from Google, Inc. located in Mountain View, Calif., or the like. Alternatively, or additionally, client systems may connect to the game server via the Internet using a standard browser application. Alternatively, or additionally, one or more of the client applications 20*a-n* may be an application configured to run on a mobile computer such as a laptop computer, handheld computer, tablet, mobile messaging device, gaming system, smart television, set-top box, over-the-top (i.e. streaming) device or the like which may all utilize different hardware and/or software packages. Other methods may be used to implement the client devices 20*a-n*.

1.2 Exemplary Communications Networks 30

Communications network 30 may be any type of private or public communication network, such as the Internet, and may include one or more communications networks. In some embodiments, the communications network 30 may be a cellular network such as, for example, a Code Division Multiple Access (CDMA) network, Global System for Mobiles (GSM) network, General Packet Radio Service (GPRS) network, cdmaOne network, CDMA2000 network, Evolution-Data Optimized (EV-DO) network, Enhanced Data Rates for GSM Evolution (EDGE) network, Universal Mobile Telecommunications System (UMTS) network, Digital Enhanced Cordless Telecommunications (DECT) network, Digital AMPS (IS-136/TDMA), Integrated Digital Enhanced Network (iDEN), Long-Term Evolution (LTE) and the like.

1.3 Exemplary Broadcast Server 40

Broadcast server 40 may store content data, user profile information and related information in a data storage device 45, receive content selection, device data, and user profile information from a client application 20*a-n*, receive content data from one or more content sources 50*a-n*, provide content data to the client applications 20*a-n* or commentators, receive campaign and collateral information from a brand investment system 60, schedule and/or place ads in broadcast content, determine and/or distribute revenue sharing among commentators, and the like. As should be apparent to one of ordinary skill in the art from the disclosure herein, other related services may also be provided. For example, the broadcast server may implement the functions described in the data flow example provided in FIG. 4.

1.4 Exemplary Data Storage Device 45

Data storage device 45 may store a variety of information, including user profile information, user preference information, content data, and the like. Although illustrated as a database, the specific storage mechanism implemented by data storage device 45 may take a variety of forms, such as one or more instances of a Heroku Dyno hosted on the Heroku platform, utilizing one or more of the following storage mechanisms: Amazon Simple Storage Service™ (Amazon S3™) Dropbox (via API integration), PostgreSQL relational database system, queuing services such as Amazon Simple Queue Service™ (Amazon SQS™) or alternatives such as RabbitMQ, Redis, Sidekiq, or cron; and/or other storage mechanisms. Other technologies also may be used. In some embodiments, all information stored in the data storage device 45 is encrypted.

1.5 Exemplary Content Data Providers 50*a-n*

One or more content sources 50*a-n* may provide event content data and/or commentary content data, content provider data and other information with broadcast server 40 via communications network 30. The event content data may be live or recorded, and the commentary content data also may be live or recorded. In some embodiments, the content sources 50*a-n* also may provide content data and/or commentary content data, content provider data (e.g. information about the commentator) and other information with client applications 20*a-n*. Both the broadcast content (event content) and the commentary content may include audio, video, graphics (such as overlays and the like) and the like.

In some embodiments, content sources 50*a-n* may comprise stand-alone broadcasting applications which may be either platform dependent or platform independent. For example, content sources 50*a-n* may be stand-alone applications for a mobile phone configured to run on a mobile operating system such as the iOS™ operating system from Apple Inc. located in Cupertino, Calif., the Android™ operating system from Google, Inc. located in Mountain View, Calif., or the like. Exemplary broadcasting applications may include OPEN BROADCAST SOFTWARE and XSPLIT GAMECASTER or XSPLIT BROADCASTER, both of which are provided by SplitmediaLabs of Hong Kong. Alternatively, or additionally, content sources 50*a-n* may be an application configured to run on mobile computer such as a laptop computer, handheld computer, tablet, mobile messaging device, gaming system or the like which may all utilize different hardware and/or software packages. In some embodiments, content sources 50*a-n* may include television broadcast sources, radio or other audio broadcasting sources, and the like. Other methods may be used to implement the content sources 50*a-n*.

1.6 Exemplary Brand Investment Systems 60

The brand investment system 60 may enable advertisers to define campaigns, submit collateral, view scheduled feeds, select particular feeds and/or commentators, and the like. For example, brand investment system 60 may provide an interface for defining a campaign, which may include collateral and/or requirements such as a target demographic(s), content type(s), budgets (which may be impression budgets, monetary budgets or the like), start and/or end dates, and the like. In some embodiments, the brand investment system 60 may allow advertisers to review lists of available feeds (content to be broadcast) and/or commentators and select specific feeds or commentators or feed/commentator pairs for ad placement.

As another example, the brand investment system 60 may allow advertisers to sponsor particular feeds that are being distributed by the content providers on a restricted "pay per view" basis. The advertiser may pay for a "free to the user" channel of the otherwise restricted content. The advertiser may pay the standard "pay-per-view" rate for each user of the free channel or for an average viewership, or a reduced rate may be provided to advertisers. Other payment structures also may be used. Viewership on the "free to the user" channel may be restricted in other ways, such as users with preexisting relationships with the advertiser (e.g. loyalty/reward members) and the like, or may be completely unrestricted.

1.7 Exemplary Third-Party Broadcast Systems 70

The system 10 may allow commentators to distribute commentary data and/or combined broadcast and commentary data to one or more distribution platforms communicate directly with one or more content sources 50a-50n via communications network 30 through API calls or the like. Alternatively, or additionally, broadcast server 40 may act as an intermediary between the third-party broadcast systems 60 and one or more content sources 50a-n for some or all of a broadcast. Exemplary third-party broadcast systems 70 may include TWITCH, MIXER, YOUTUBE, FACEBOOK LIVE and the like.

2.0 Exemplary eSports Broadcast With Multiple Associated Commentary Streams

Although reference will now be made to certain embodiments described herein with reference to an eSports broadcast, the principles presented herein may be used for other live or archived ("VOD") events or shows that may be provided with commentary, such as poker tournaments, traditional sporting events, political debates, and the like. The embodiments illustrated herein should therefore not be interpreted to be exclusive or limiting, but rather exemplary or illustrative.

Figure 2:
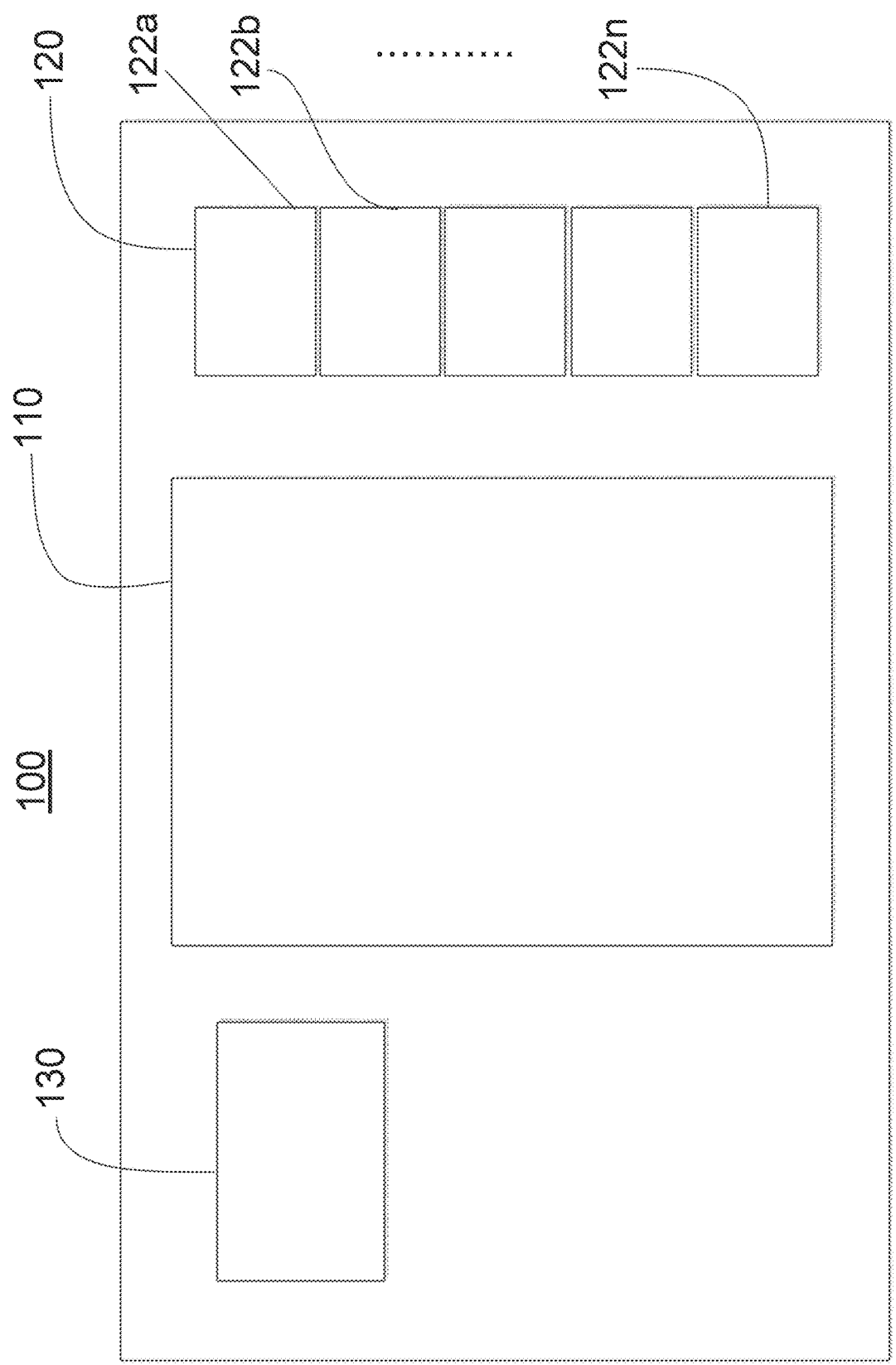
FIG. 2 shows a diagram of an exemplary user interface for viewing broadcast content and a selected one of a plurality of commentary streams.

Referring to FIG. 2, a screen shot 100 of an exemplary client application 20a is shown. Upon logging in to the server 40, the client application 20a may present the viewer with an interface 100 through which the viewer may select a variety of event content from one or more content sources 50a-n. Exemplary event content may include, for example, a plurality of live and/or recorded poker tournaments, eSports events, or the like. In some embodiments, the content may be segmented into various categories based any number of criteria, such as game type, teams and/or players involved in a game, and the like. Search capabilities also may be provided by interface 100. Various meta-data about the event also may be presented to the user and/or queried in response to a search.

Upon selection of a particular piece of event content, the interface 100 may begin displaying the selected event content in event content display region 110. The event content display region 110 may be moved, resized, and otherwise manipulated by the user via interface 100.

In addition, the interface 100 also may present the user with a plurality of available live and/or recorded commentary content data associated with the selected event. In other words, the interface creates a pop up network of commentators for each feed. In the illustrated embodiment, a list 120 of available commentary content 122a-n may be presented to the user. Similar to the event content data, the commentary content 122a-n may be segmented and/or otherwise organized.

Upon selection of a piece of commentary content 122a-n, the interface 100 may begin displaying the selected commentary content 122a in the commentary content display region 130. The commentary content display region 130 may be moved, resized, and otherwise manipulated by the user via interface 100. To switch to another piece of commentary content, the user may select another piece of commentary content 122a-n from the list 120.

The event content and the commentary content 122a-n may be associated with one another and also may be linked or otherwise synchronized so that the commentary data and the content data are presented cohesively to the user. Optionally, one set of playback controls may be provided by the interface 100, or each of the display regions 110 and 130 may include separate playback controls. Where multiple playback controls are provided to the user, manipulation of the playback of either the content data or the commentary data may simultaneously impact the other such as picture in picture (PIP).

In some embodiments, both the event content and the commentary content 120a-n may include video and/or audio. In such embodiments, the user may be able to select between one of the event audio and the commentary audio, or play both audio tracks simultaneously. For example, event audio may include one or more of game audio, player voices and the like that may not interfere with the commentary audio and both may be played simultaneously. Optionally, the user may be able to modify the levels of each audio channel to their preference. In other embodiments, the event content may include only video so that the commentary audio is the only audio track played during a broadcast. In yet other embodiments, the commentary content data may include only audio data. Other permutations of audio and video data also may be used.

Optionally, the event data may include multiple video and/or audio streams that may be selected by the user. For example, player data from each player's perspective may be provided, enabling the user to select any player in a match to see the game from their perspective. The commentary content may include commentary for each stream associated with an event. Alternatively, or additionally, a single commentary stream may be provided for all streams associated with an event or a subset of streams associated with an event, such as all the streams for players of the same team and the like.

In other embodiments, both the event (or broadcast) data and the commentary content may be displayed in a single region, such as region 110. For example, commentary content may include only overlay graphics or video (such as video shot primarily in front of a green screen) so that it may be integrated substantially seamlessly with the broadcast data.

Figure 3:
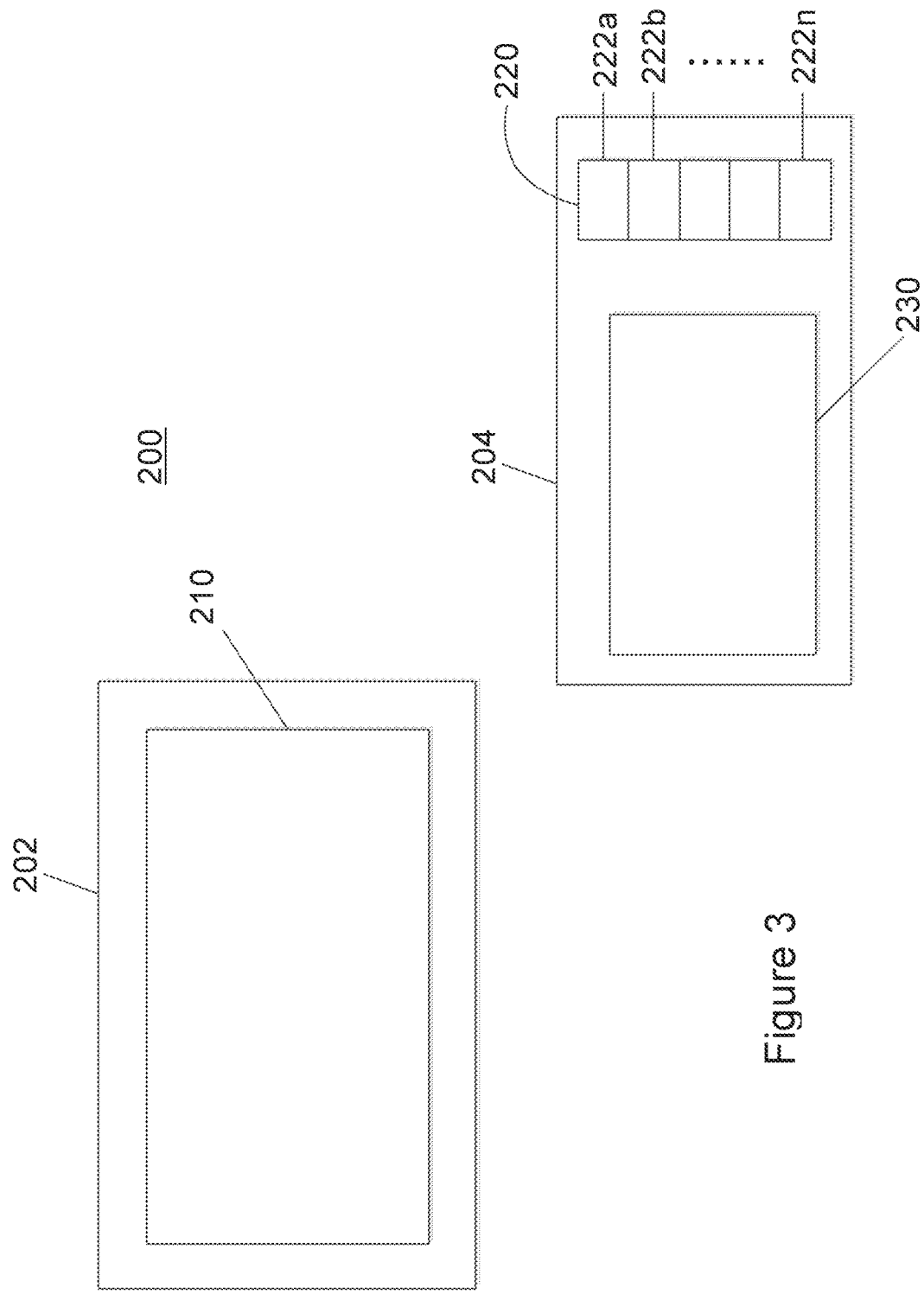
FIG. 3 shows a diagram of exemplary user interfaces for viewing broadcast content and a selected one of a plurality of commentary streams across multiple devices.

3.0 Exemplary eSports Broadcast Across Multiple Devices and Multiple Associated Commentary Streams Referring to FIG. 3, a diagram of a broadcast across multiple client applications 20a and 20b is shown. The multiple device broadcast operates similarly to single device broadcast, except in the multiple device broadcast, one device 202 includes the event content display region 210 and the other device 204 includes the list 220 of available commentary content 222a-222n and the commentary content display region 230. The client applications 20a and 20b running on the devices 202 and 204, respectively, may communicate with one another directly and/or through the server 40 to synchronize playback, update the list 220 with available commentary, and the like.

In some embodiments, one client application 20a may be used to play commentary content associated with a live broadcast on traditional television (i.e. non-smart television). In such embodiments, the client application 20a may or may not be able to communicate with the provider of the televised content. Accordingly, the user may be able to select a televised event (similar to selecting an event broadcast as described above) to be presented with a list of available commentary content for the televised event. Alternatively, or additionally, the user may be able to search for televised content or enter provider and/or channel information for the televised event they are watching to retrieve the list 220 of available commentary content 222a-n.

Upon selection of a piece of commentary content 222a-n, the selected commentary content 222a may be displayed in the commentary content display region 230. The commentary content display region 230 may be moved, resized, and otherwise manipulated by the user. To switch to another piece of commentary content, the user may select another piece of commentary content 222a-n from the list 220.

The event content and the commentary content 222a-n may be associated with one another and also may be linked or otherwise synchronized so that the commentary data and the content data are presented cohesively to the user. Optionally, one set of playback controls may be provided by the interface 200, or each of the display regions 210 and 230 may include separate playback controls. Where multiple playback controls are provided to the user, manipulation of the playback of either the content data or the commentary data may simultaneously impact the other.

In some embodiments, both the event content and the commentary content 220a-n may include video and/or audio. In such embodiments, the user may be able to select between one of the event audio and the commentary audio, or play both audio tracks simultaneously. For example, event audio may include one or more of game audio, player voices and the like that may not interfere with the commentary audio and both may be played simultaneously. Optionally, the user may be able to modify the levels of each audio channel to their preference. In other embodiments, the event content may include only video so that the commentary audio is the only audio track played during a broadcast. In yet other embodiments, the commentary content data may include only audio data. Other permutations of audio and video data also may be used.

4.0 Exemplary Data Flow for a Multiple Commentary Broadcasting System

Figure 4:
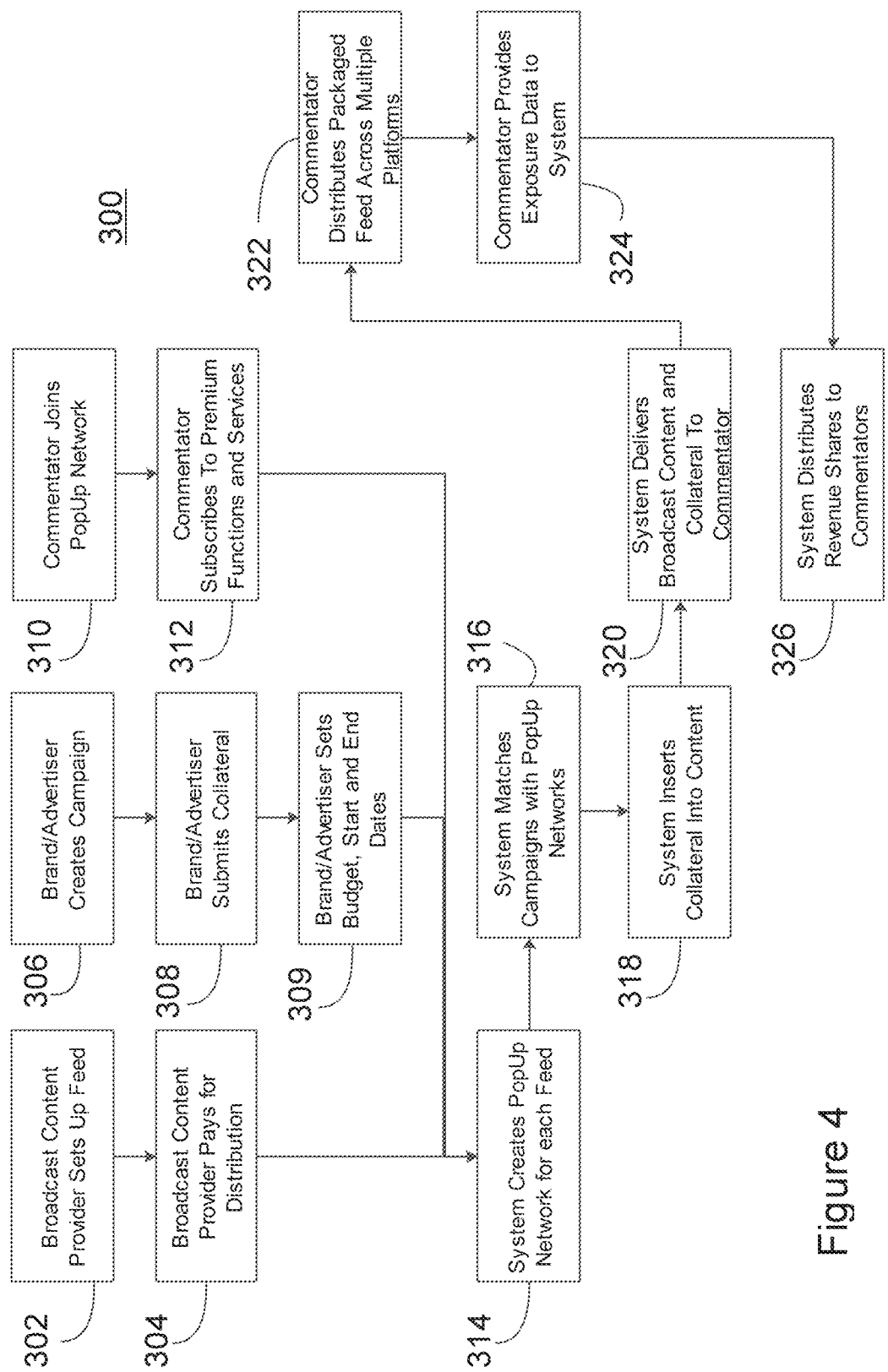
FIG. 4 shows an exemplary data flow diagram for an exemplary system for providing multiple commentary streams for an underlying broadcast content.

Referring to FIG. 4, an exemplary data flow 300 for an exemplary system for providing multiple commentary streams for an underlying broadcast content is shown. Initially, a broadcast content provider may set up a feed at step 302. As noted above, a feed is another term for broadcast content, such as event content. Feed registration may include specifying a content type and demographic information for the feed. In some embodiments, the broadcast content provider also may format the content by creating metadata triggers for brand/ad insertions. Exemplary metadata triggers may include triggers for different types of brand exposures that content providers choose, which may be inserted in the feed in real time as part of a live production or pre-packaged into the feed for recorded content, such as trigger for a fifteen second mid-roll ad, thirty second pre-roll ad, fifteen second logo bug exposure, fifteen second transition card, and the like. Other ad placement mechanisms also may be used. In some embodiments, the broadcast content provider also may create a channel and schedule broadcast.

In some embodiments, broadcast content provider may be able to set requirements for the types of brands and/or commentators that may access the content. In such embodiments, the setup process 302 may include submit requirements and/or filters for commentators and brands (discussed in more detail below). In response, the system 12 may automatically determine matching brands and commentators, submit the matches to the broadcast content provider to review and/or approve, and/or allow the broadcast content provider to manually or automatically curate list of brands and commentators.

In some embodiments, broadcast content provider may be required to pay for distribution of a feed at step 304. Alternatively, or additionally, feeds may be distributed free of charge to broadcast content providers or for a share of revenues generated from any sources, including brands, commentators, or users.

A brand that wants to advertise in the system 12 may begin by defining a campaign at step 306, which may include establishing requirements such as a target demographics and content types. Next, the brand may submit collateral at step 308. The collateral may include, for example, a logo bug, banner, fifteen and thirty second mid-roll/pre-roll ads, transition cards, script for on-air reads, and the like. In some embodiments, the collateral may include metadata hooks corresponding to the metadata triggers placed in the content to assist the system in automatically placing ads during a broadcast.

At step 309, the brand may establish campaign properties, such as a budget, start and end dates and the like. Budgets may include, for example, set parameters for total spend by exposure type, feed, commentator and the like. Budgets may be adjustable on the campaign level and/or for individual collateral, and campaigns may end at the end date, when the campaign's budget has been met, or the like. In some embodiments, a brand may be able to view available scheduled feeds by demographic target and content type and manually select (or de-select/blacklist) scheduled feeds and/or commentators. Alternatively, or additionally, brand may be automatically matched with broadcast content and/or commentators by using campaign requirements.

Commentators may begin to use the system 12 by registering at step 310. Registration may include providing commentators' credentials for Third Party Broadcasting Systems 70 (Section 1.7), commentator audience demographic information, style (such as humorous, technical, etc.) and/or social platform credentials for streaming and mentions. This information may be manually or automatically verified by the system 12. Commentators also may be required to agree to guidelines regarding adherence to feed provider and brand requirements, and terms of use. Registration also may include submitting audience and demographic data, which also may be manually and/or automatically verified by the system 12 for different pieces of information.

Once registered, a commentator may view available scheduled feeds by feed provider and/or brand advertisers/sponsors and request a scheduled feed. Alternatively, or additionally, the system may automatically match a feed to a commentator. In other words, the system 12 may provide a list of suggested feeds/brands that have similar demographics to those of the commentator.

In some embodiments, the commentator may have the option of subscribing to premium functions and services at step 312. For example, the auto-matching feature may be a premium service. Other premium services may include access to advanced analytics, promotional features (such as premium placement within a list of available commentators) and the like.

At step 314, the system may create a pop up network for a feed, which may include scheduling the broadcast and/or distributing it when a feed producer makes the feed live, matching the popup network with appropriate campaigns at step 316, and inserting appropriate collateral in accordance with the metadata triggers and hooks at step 318. The system 12 may then deliver the packaged content (broadcast data and collateral) to commentators at step 320.

In response, the commentator may comment on the packaged content at step 322 and distribute it through the system 12 and/or through third-party distribution systems 70. During and/or after the broadcast, the commentator may provide exposure data to the system 12 at step 324. Exposure data may include viewership on each demographic group, duration, type of exposure/collateral and the like. The system 12 may be able to track sharing of fan clips and other derivatives from a commentator's stream with watermarking or other methods. Other metrics such as CPM and similar other online and television advertising and sponsorship value calculations also may be used.

The system in turn, may collect all available tracking data from each commentator distributing a feed and provide a more accurate indication of the reach obtained for the content and advertisements. For example, the system may provide tracking of social media and broadcast mentions, ad copy readings, key words, and the like. Based on this improved data collection, the system may distribute revenue among the commentators (and/or feed providers) at step 326. Revenue may be distributed based on the relative performance of the commentator stream. Alternatively, or additionally, specific agreements between feed providers, brands and commentator also may be implemented.

In some embodiment, the system 12 may include manual (i.e. by a person) and automated real-time monitoring, including filtering of trigger words (such as inappropriate language for a particular feed or brand's requirements), a time delay for inserting beeps or otherwise canceling inappropriate audio or video, and the like. The system 12 also may include artificial intelligence, data analysis, visual recognition and other systems and tools to facilitate or optimize exposure tracking, value measurement, commentator feed monitoring and real time analysis for things like violations of brand value and positive mentions/reading of advertising copy/sponsor keywords, recommendations for to match broadcasts, brands, commentators, and users to each other.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system for distributing a popup network of multiple live commentaries for a live broadcast, comprising:
   a first software module for use on a server computer comprising one or more processors and one or more memories, the first software module including instructions stored on a non-transitory computer readable medium that:
   receive broadcast data associated with a live broadcast from a content provider;
   receive a plurality of requests to provide live commentary on the live broadcast, each request to provide live commentary on the live broadcast being associated with a registered commentator having an associated client device;
   generate one or more feeds comprising the broadcast data;
   provide the one or more feeds to the client devices;
   and a second software module for use on each of the client devices associated with the registered commentators, each client device comprising one or more processors and one or more memories, the second software module including instructions stored on a non-transitory computer readable medium that:
   provide, to the server computer, commentator credentials associated with the registered commentator and a selection of commentator subscription options for additional features, wherein the commentator subscription options selectable by the registered commentator include an auto-matching feature, advanced analytics, and promotional feature;
   transmit, to the server computer, a request to provide live commentary on the live broadcast;
   receive a particular feed of the one or more feeds;
   generate commentary data; and
   distribute the particular feed and the commentary data to a plurality of viewers.

2. The system of claim 1, where the second software module further includes instructions that track data comprising either viewership associated with the commentary data, social media reach associated with the commentary data, or both.

3. The system of claim 2, where the second software module further includes instructions that transmit the tracked data to the server computer.

4. The system of claim 3, where the first software module further includes instructions that receive the tracked data from each of the client devices and generate either total viewership data associated with the commentary data, total social media reach associated with the commentary data, or both.

5. The system of claim 3, where the second software module further includes instructions that provide the particular feed and the commentary data to a third-party distribution system.

6. The system of claim 5, where the second software module further includes instructions that receive, from the third-party distribution system, either viewership data associated with the commentary data, social media reach data associated with the commentary data, or both and add the data received from the third-party distribution system to the tracked data.

7. The system of claim 1, where the second software module further includes instructions that provide the particular feed and the commentary data to a third-party distribution system.

8. The system of claim 1, where the first software module further includes instructions that receive advertisement collateral from an advertiser and insert the received collateral into at least one of the one or more feeds comprising the broadcast data.

9. The system of claim 8, where the broadcast data includes metadata triggers for ad placement within the broadcast data and the received collateral includes metadata hooks, where the first software module further includes instructions that insert the received collateral into at least one of the one or more feeds based on the metadata triggers and metadata hooks.

10. The system of claim 9, where the broadcast data has associated demographic information, where the collateral has associated target demographic information, and where the first software module further includes instructions that insert the received collateral into the at least one of the one or more feeds based on the demographic information associated with the broadcast data and the target demographic information associated with the collateral.

11. The system of claim 8, where the first software module further includes instructions that receive a request to include collateral in the particular feed provided to a specific one of the commentators.

12. An interface for distributing live broadcast content and a plurality of live commentary content associated with the live broadcast content, comprising:
    a first interface element for providing a selectable list of available broadcast data associated with the live broadcast content;

a first display region for displaying a selected one of the available broadcast data in response to a selection of one of the available broadcast data;

a second interface element for providing a selectable list of available live commentaries from registered commentators, the live commentaries associated with the selected broadcast data, wherein the list of available live commentaries is provided according to commentator credentials and commentator subscription options for additional features associated with each registered commentator, wherein the commentator subscription options selectable by the registered commentator include an auto-matching feature, advanced analytics, and promotional feature; and a second display region for displaying commentary data associated with a selected one of the available live commentaries in response to a selection of one of the available live commentaries.

13. The interface of claim 12, where the first display region and the second display region are the same.

14. The interface of claim 12, further comprising a set of playback controls for the first display region.

15. The interface of claim 14, where the set of playback controls for the first display region also controls playback for the second display region.

16. The interface of claim 14, further comprising a second set of playback controls for the second display region.

17. The interface of claim 12, wherein the first display region is manipulable.

18. The interface of claim 12, wherein the second display region is manipulable.

19. A system for distributing live broadcast content and a plurality of live commentaries associated with the live broadcast content, comprising:

a first software module for use on a first device comprising one or more processors and one or more memories, the first software module including instructions stored on a non-transitory computer readable medium that:
provide a user with a list of available feeds, each feed including associated live broadcast content;
receive a selection of a feed;
transmit, to a server computer, a request to stream broadcast content data associated with the selected feed;
display broadcast content data for the selected feed and a list of associated live commentaries from registered commentators for the selected feed;
receive a selection of a selected live commentary from the list of associated live commentaries, wherein the list of available live commentaries is provided according to commentator credentials and commentator subscription options for additional features associated with each registered commentator, wherein the commentator subscription options selectable by the registered commentator include an auto-matching feature, advanced analytics, and promotional feature;
transmit, to the server computer, a request to stream commentary content data associated with the selected live commentary; and
display commentary content data for the selected live commentary with the live broadcast content;

and a second software module for use on the server computer comprising one or more processors and one or more memories, the second software module including instructions stored on a non-transitory computer readable medium that:
store broadcast content data for a plurality of feeds associated with live broadcast content and a list of one or more associated live commentaries for each of the plurality of feeds;
receive, from the first device, the request to stream broadcast content data;
distribute, to the first device, the broadcast content data for the selected feed indicated in the request to stream broadcast content data;
transmit, to the first device, information about the one or more associated live commentaries;
receive, from the first device, the request to stream commentary content data; and
distribute, to the first device, the commentary content data for the selected live commentary indicated in the request to stream commentary content data.

20. The system of claim 19, where the second software module further includes instructions that receive advertisement collateral from an advertiser and insert the received collateral into at least one of the plurality of feeds.

21. The system of claim 20, where the live broadcast content includes metadata triggers for ad placement within the live broadcast content and the received collateral includes metadata hooks, where the first software module further includes instructions that insert the received collateral into at least one of the plurality of feeds based on the metadata triggers and metadata hooks.

22. The system of claim 21, where the broadcast content data has associated demographic information, where the collateral has associated target demographic information, and where the first software module further includes instructions that insert the received collateral into the at least one of the plurality of feeds based on the demographic information associated with the broadcast content data and the target demographic information associated with the collateral.

* * * * *